Jan. 6, 1931.     J. W. BRYCE     1,788,011
COMPOUND LENS FOR READING SCALE CHARTS
Filed Aug. 5, 1927
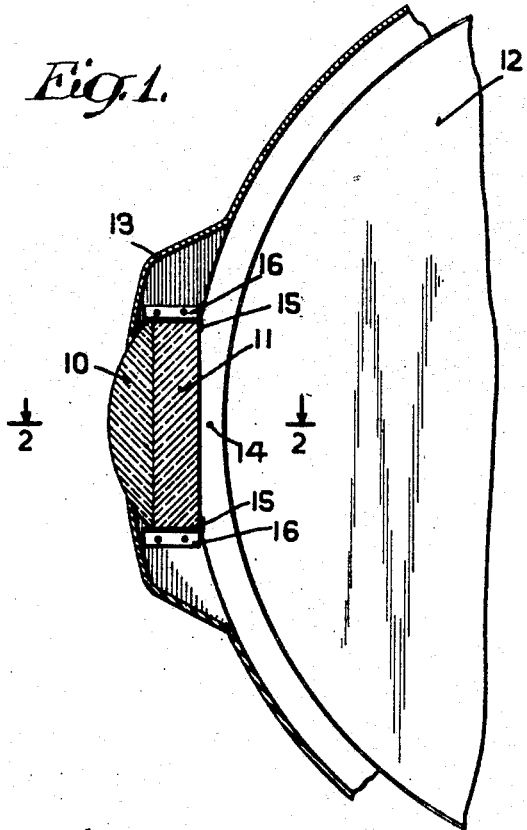
Fig. 1.
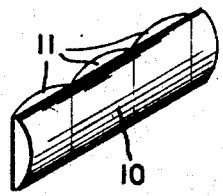
Fig. 3.
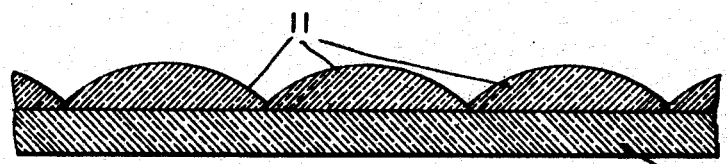
Fig. 2.
Fig. 4.  Fig. 5.  Fig. 6.  Fig. 7.
  6       6       6       6
Inventor
James W. Bryce
By his Attorney
W. M. Wilson Patented Jan. 6, 1931

1,788,011

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

COMPOUND LENS FOR READING SCALE CHARTS

Application filed August 5, 1927. Serial No. 210,823.

This invention relates to magnifying lenses and more particularly to a compound lens for reading graduations on a drum scale chart in which the graduations are disposed along a horizontal line.

In prior construction scales have been equipped with lenses magnifying characters on the chart in one direction only. With such a construction a character being magnified by a horizontal lens would appear elongated vertically while an analogous character being magnified by a vertical lens would appear elongated horizontally.

According to the present invention I have succeeded in producing a compound lens wherein each character magnified on a chart is elongated broadly and vertically in its true proportions. This I have succeeded in accomplishing by utilizing a plurality of vertically extending lenses convexed to magnify in a horizontal direction. These lenses are superimposed upon a horizontal lens convexed to magnify in a vertical direction. It is, of course, obvious that a single magnifying lens convexed to magnify in all directions may be employed but a construction of this nature would necessitate a lens as high as it is wide and it would also have to be very thick. Also if a lens of this character were cut so as to constitute a long narrow lens it obviously would also be extremely thick.

An object of my invention is to provide a lens for use in connection with a drum scale where a horizontal line of figures is to be read in which the characters may be magnified in both vertical and horizontal directions.

These and various other objects of my invention will be obvious from the following particular description of one form of mechanism embodying the invention or from an inspection of the accompanying drawing in which Fig. 1 is a side sectional view of my compound lens attached to a drum scale.

Fig. 2 is a sectional view taken on line 2—2 of Fig. 1.

Fig. 3 is a perspective view of the several lens elements assembled.

Figs. 4, 5, 6 and 7 are views showing a character in normal condition and the same character enlarged by the component parts of the lenses separately and in their assembled positions.

Referring now to the drawing, Fig. 3 indicates the method of assembling the several lenses 10 and 11. Here the lens 10 is shown as a long narrow lens convexed to enlarge objects in a vertical direction only while a plurality of lenses 11 curved to enlarge objects in a horizontal direction are mounted side by side upon the lens 10.

Referring to Fig. 1 a fragmentary view of a drum scale is shown as comprising a drum 12, a casing 13 and an indicating line 14. The vertically extending lenses 11 are rigidly secured in the aperture of the scale in front of the drum 12 by means of a frame 15. The frame 15 is held in position by a set of brackets 16 fixed on both sides of the frame. The vertically extending lenses 11 are cemented to the horizontal lens 10 or may be held rigidly against the same by means of the scale casing 13.

Presuming the digit 6 (Fig. 4) to be viewed through the horizontal lens element 10 the digit will be enlarged vertically as indicated in Fig. 5, while if viewed through one of the vertically extending lens elements 11 it will be magnified horizontally as viewed in Fig. 6. Should the digit be viewed through the two lens elements 10 and 11 in their assembled state, the digit would be magnified vertically and horizontally in its true proportions as viewed in Fig. 7. It is, therefore, obvious with such a construction that the characters appearing on a scale chart may be easily read.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. In a weighing scale provided with a chart having rows of graduations, a chart reading device comprising a fixed indicator cooperating with said chart and a magnifying device cooperating with said fixed indicator to present a magnified image of the readings, said magnifying device consisting of a single lens extending across the chart rows and a plurality of parallel lenses fixed relatively to said first-named lens and extending parallel to the chart rows.

2. In a weighing scale such as described in claim 1, each of said lenses being curved on one face and plane on the other face, the plane faces of the parallel lenses being fixed in contact with the plane face of the first-named single lens.

3. In a scale such as described in claim 1, said parallel lenses being of the same length as the width of the single lens, and a single holding frame for immovably carrying all of said lenses.

4. In a scale such as described in claim 1, all of said lenses being curved and having the same curvature throughout their length.

In testimony whereof I hereto affix my signature.

JAMES W. BRYCE.